United States Patent
Ok et al.

(10) Patent No.: US 7,407,995 B2
(45) Date of Patent: Aug. 5, 2008

(54) SYNTHESIS OF MDH-POLYMER HYBRID PARTICLES

(75) Inventors: Jeong-Bin Ok, Gyeonggi-do (KR); Krzysztof Matyjaszewski, Pittsburgh, PA (US)

(73) Assignees: LS Cable Ltd., Seoul (KR); Carnegie Mellon University, Pittsburgh, PA (US)

( * ) Notice: Subject to any disclaimer, the term of this patent is extended or adjusted under 35 U.S.C. 154(b) by 31 days.

(21) Appl. No.: 11/593,185

(22) Filed: Nov. 3, 2006

(65) Prior Publication Data

US 2007/0197693 A1    Aug. 23, 2007

Related U.S. Application Data

(60) Provisional application No. 60/733,958, filed on Nov. 4, 2005.

(51) Int. Cl.
*C08K 3/22* (2006.01)

(52) U.S. Cl. ....................... 523/205; 524/436

(58) Field of Classification Search ................. 523/205; 524/436

See application file for complete search history.

(56) References Cited

U.S. PATENT DOCUMENTS

| | | | | |
|---|---|---|---|---|
| 4,678,819 A | * | 7/1987 | Sasaki et al. ................. | 523/171 |
| 5,039,509 A | * | 8/1991 | Miyata et al. ................ | 423/636 |
| 5,762,901 A | * | 6/1998 | Richmond et al. ........... | 423/635 |
| 6,451,901 B1 | * | 9/2002 | Maekawa et al. ............ | 524/505 |
| 2007/0185240 A1 | * | 8/2007 | Masuda et al. ............... | 523/205 |

FOREIGN PATENT DOCUMENTS

JP    57061714 A   *   4/1982

* cited by examiner

*Primary Examiner*—Bernard Lipman
(74) *Attorney, Agent, or Firm*—Jones Day

(57) ABSTRACT

Disclosed is the preparation of organic/inorganic hybrid particles comprising magnesium hydroxide cores and tethered copolymer chains whose composition can be selected to allow dispersion in targeted plastic materials, thereby providing improved mechanical, electrical and flame retardant properties. Processes for preparing the same are also disclosed.

8 Claims, 6 Drawing Sheets

US 7,407,995 B2

SYNTHESIS OF MDH-POLYMER HYBRID PARTICLES

CROSS-REFERENCE TO RELATED APPLICATION

This application claims priority to U.S. Provisional Patent Application Ser. No. 60/733,958, filed Nov. 4, 2005, the entirety of which is incorporated herein by reference.

FIELD OF THE INVENTION

The present application relates to the preparation of organic/inorganic hybrid particles comprising magnesium hydroxide cores and tethered copolymer chains whose composition can be selected to allow dispersion in targeted plastic materials, thereby providing improved mechanical, electrical and flame retardant properties.

BACKGROUND OF THE INVENTION

The controlled radical polymerization (CRP) processes have gained increasing attention because CRP couples the advantages afforded by conventional free radical polymerization (RP) to (co)polymerize a wide range of monomers using various commercially viable processes with the ability to synthesize polymeric materials with predetermined molecular weight (MW), low polydispersity (PDI), controlled composition, site specific functionality, selected chain topology and incorporate bio- or inorganic species into the final product.

The three most studied methods of controlling radical polymerization are nitroxide mediated polymerization (NMP), atom transfer radical polymerization (ATRP), and degenerative transfer with dithioesters via reversible addition-fragmentation chain transfer polymerization (RAFT). Each of these methods relies on establishment of a dynamic equilibrium between a low concentration of active propagating chains and a predominant amount of dormant chains that are unable to propagate or terminate as a means of extending the lifetime of the propagating chains. The low concentration of active species reduces the probability of bimolecular termination reactions, leading to radical polymerization processes that behave as a "living" system. In order to control molecular weight and molecular weight distribution there should be quantitative fast initiation ($R_i$), at least as fast as propagation($R_p$), ($R_i \ll R_p$ to $R_i \sim R_p$ controlling $DP_n$ (~$[M]/[I]_0$) where [M] is the moles of monomer polymerized and [I] is the initial concentration of the added initiator).

However, since CRP processes are radical based polymerization processes some degree of termination reactions are unavoidable. In all radical polymerizations, biradical termination ($k_t$) occurs with a rate which is dependent on the concentration of radicals ([P*]) to the power two, ($R_t = k_t[P^*]^2$). Therefore, at the same polymerization rate (the same concentration of radicals), essentially the same number of chains would terminate, regardless if a conventional RP or a CRP system had been employed. This ignores to some degree the diffusion effect of macro-radicals since in a RP most chains are terminated by the reaction of a small radical with a growing polymer radical. In the case of SFRP, or ATRP, these initial termination reactions push the equilibrium to the left hand side, (increasing $k_{deact}$) as a consequence of forming an excess of dormant species, as a result of the persistent radical effect, [Fischer, H. Chem. Rev. 2001, 101, 3581-3610.] With the net result that in the conventional process, all chains are terminated, whereas in CRP, as a result of the greater number of growing chains, the terminated chains constitute only small fraction of all chains (~1 to 10%). The remaining species are dormant species, capable of reactivation, functionalization, chain extension to form block copolymers, etc. Thus CRP behaves as a "living" system. [Greszta, D. et. al. Macromolecules 1994, 27, 638.] Additionally, relatively fast initiation, at least as fast as propagation, provides control over molecular weight ($DP_n = \Delta[M]/[I]_0$; i.e. the degree of polymerization is defined by the ratio of concentrations of the consumed monomer to the introduced initiator) and narrow molecular weight distribution.

As used herein, "polymer" refers to a macromolecule formed by the chemical union of monomers, typically five or more monomers. The term polymer includes homopolymers and copolymers including random copolymers, statistical copolymers, alternating copolymers, gradient copolymers, periodic copolymers, telechelic polymers and polymers of any topology including block copolymers, graft polymers, star polymers, bottle-brush copolymers, comb polymers, branched or hyperbranched polymers, and such polymers tethered to particle surfaces or flat surfaces as well as other polymer structures.

ATRP is the most frequently used CRP technique with a significant commercial potential for many specialty materials including coatings, sealants, adhesives, dispersants but also materials for health and beauty products, electronics and biomedical applications. The most frequently used ATRP procedure is based on a simple reversible halogen atom transfer catalyzed by redox active transition metal compounds, most frequently copper.

ATRP is considered to be one of the most successful controlled/"living" radical processes (CRP) and has been thoroughly described in a series of co-assigned U.S. Patents and Applications, such as U.S. Pat. Nos. 5,763,548; 5,807,937; 5,789,487; 5,945,491; 6,111,022; 6,121,371; 6,124,411; 6,162,882; 6,407,187; 6,512,060; 6,538,091; 6,541,580; 6,624,262; 6,624,263; 6,627,314; 6,759,491; and U.S. patent applications Ser. Nos. 09/534,827; 09/972,056; 10/034,908; 10/269,556; 10/289,545; 10/638,584; 10/860,807; 10/684,137; 10/781,061 and 10/992,249, all of which are herein incorporated by reference. ATRP has also been discussed in numerous publications with Matyjaszewski as co-author and reviewed in several book chapters. [ACS Symp. Ser., 1998, 685; ACS Symp. Ser., 2000; 768; Chem. Rev. 2001, 101, 2921-2990; ACS Symp. Ser., 2003; 854.] Within these publications similar polymerization procedures may be referred to by different names, such as transition metal mediated polymerization or atom transfer polymerization, but the processes are similar and referred to herein as "ATRP".

ATRP has certain advantages. Many commercially available initiators may be used and various macroinitiators, including wafers, inorganic colloids, glass, paper, and bioactive molecules including proteins, DNA, carbohydrates and many commercial polymers may be simply synthesized. Many polymers produced by ATRP allow facile functionalization or transformation of the end groups by replacing terminal halogens with azides, amines, phosphines and other functionalities via nucleophilic substitution, radical addition or other radical combination reactions. An abundance of (co) polymerizable monomers are available. This allows production of macromolecules with complex topology such as stars, combs and dendrimers, coupled with the ability to control composition and hence functionality in block, gradient, periodic copolymers etc. and even control polymer tacticity. The procedure is a simple procedure which may be carried out in bulk, or in the presence of organic solvents or in water under homogeneous or heterogeneous conditions, in ionic liquids, and in supercritical $CO_2$.

Many commercial plastic materials are made non-flammable by the use of organohalogen type fire retardants. This method, however, poses problems such as toxicity of fire retardants, corrosion of equipment during melt processing, and emission of smoke and toxic fumes during processing and in subsequent fires. Therefore, much attention has been paid to replacing this type of fire retardant with inorganic materials such as aluminum hydroxide (ATH) and magnesium hydroxide (MDH), which are nontoxic and avoid the above-mentioned difficulties. This type of flame retardant is perhaps the most environmentally friendly type of flame retardant since both ATH and MDH release only water vapor during a fire. Released water can block the flame and exclude oxygen by diluting the presence of flammable gases in the contacting atmosphere. In addition, char formed on the surface of the polymer works as a heat insulating barrier so it interrupts the flow of flammable decomposition products. The additives can work alone or in the presence of other intumescent additives. However, ATH begins to dehydrate at about 180° C. and is hence unusable for use in thermoplastics resins, such as polyesters whose processing temperature is at least 200° C. MDH, on the other hand, has the advantage that its decomposition into MgO and $H_2O$ starts at a relatively high temperature (300-320° C.), thus allowing it to be melt compounded into plastics for which ATH is not sufficiently thermally stable.

Both ATH and MDH have some drawbacks. To be effective as a flame retardant, high filler loading (60 wt %) is necessary, resulting in a significant loss in mechanical properties, especially in elongation at break and stress whitening in bending deformation. Recently there has been a great demand to develop thermoplastic based resins as cable insulating materials for the cable industry. This is particularly true for automotive cable insulation applications where plasticized PVC and PE/EVA are the main polymers currently used. PVC, although a better fire retardant polymer than polyolefins, is a source of health and environmental problems due to PVC's potential for release of chlorine-containing chemicals.

The state of the current art for polypropylene composites filled with MDH particles has been provided by Hong et. al. [Hong, et.al: Journal of Applied Polymer Science 97: 2311-2318, 2005] In their summary of prior art, it is noted that the morphology, size, dispersion, and applied surface coating on particles influence the mechanical properties of MDH filled PP composites. It was found that the tensile yield strength decreased in proportion to the increase in the incorporated amount of MDH, because there was no adhesion between the filler and the polymer matrix. However, surface coating with sodium stearate was shown to enhance the compatibility with the resin, but did not afford a chemical bond between the filler and matrix. Further, surface coating with stearic acid led to the reduction in tensile yield strength of the composite compared to composites containing pure MDH, due to the lower thermodynamic work of adhesion. It was reported that PPgMA molecules were chemically bonded on the filler surface due to the acid-base interaction between carboxyl groups grafted on PPgMA and hydroxyl groups from the filler surface. While improvements were noted for PPgMA/MDH blends the surface interactions are fortuitous, different graft copolymers may have to be prepared for every matrix material. There is no control over the molecular weight of fortuitously grafted to copolymers, hence the morphology of the final composite structure can not be controlled, nor can the amount of material attached to the MDH particle.

Therefore, there is a need for an environmentally benign flame retardant that can be efficiently dispersed in polyolefins, and other thermoplastic and thermoset plastics, to provide both flame retardancy and provide property enhancement. The present invention provides particles with attached polymer chains that are miscible in the matrix polymer. Since they are inherent nanocomposite particles, the attached polymer chains act to provide uniform dispersion of the particles throughout the matrix, thereby improving bulk physical properties such as stress behavior of the resulting alloy.

SUMMARY OF THE INVENTION

The present invention provides a MDH composite comprising a magnesium hydroxide (MDH) particle with attached (co)polymer chains, where the Mn/Mw of the tethered chains is less than 2.0.

The present invention also provides a process for the preparation of the MDH composite, where a controlled radical (co)polymerization is conducted from attached initiator functionality. In the process, the controlled radical (co)polymerization can be a NMP, RAFT/MADIX or ATRP reaction. The controlled radical (co)polymerization can be an ATRP. The ligand of the ATRP can be selected to allow separation of the catalyst complex from the MDH composite after the reaction is complete by dissolution in the solvent/reactants or an added solvent.

The present invention also provides a polymer blend or alloy, where the MDH composite is dispersed in an added plastic material.

The present invention also provides a process for the preparation of the composite MDH particle, where the polymerization is conducted in a slurry or dispersion. The first MDH particles of the process can be functionalized by conducting an esterification reaction with a molecule additionally comprising a functional group to initiate a polymerization reaction.

DETAILED DESCRIPTION OF THE INVENTION

Figure 1:
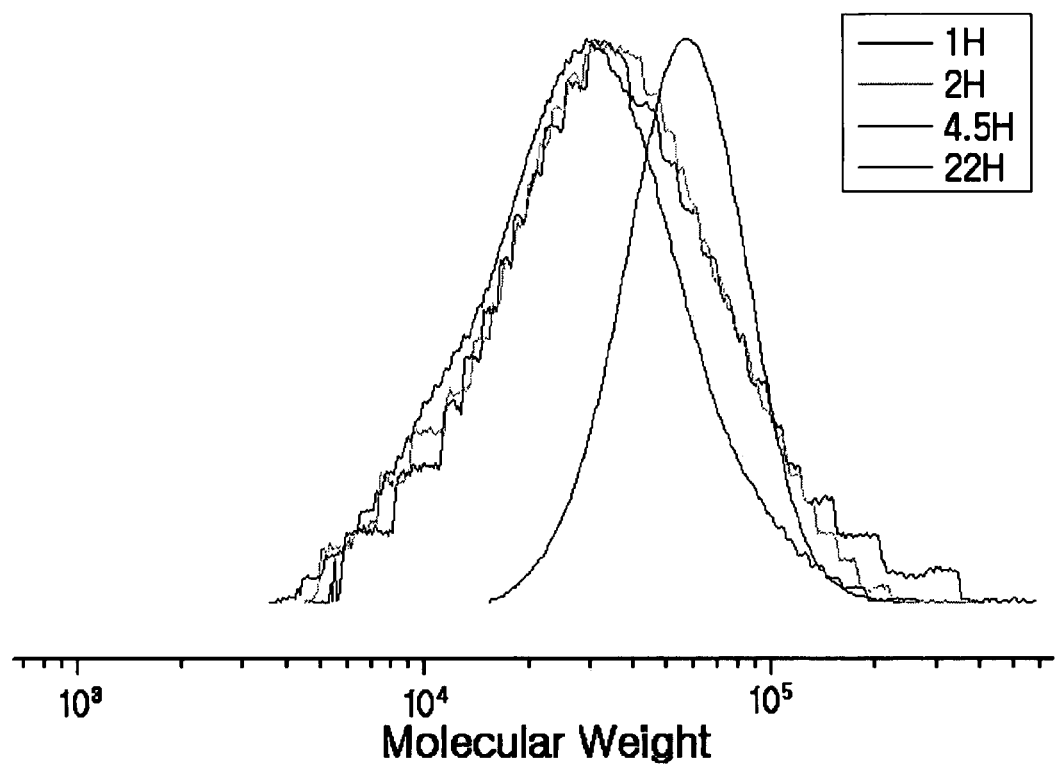
FIG. 1 shows evolution of the molecular weight for butyl acrylate grafting from MDH particles.

Definitions included in incorporated references apply in this application. However, before describing the present invention in detail, it is to be understood that this invention is not limited to specific compositions, components or process steps, as such may vary. It is also to be understood that the terminology used herein is for the purpose of describing particular embodiments only, and is not intended to be limiting.

It should be noted that, as used in this specification and the appended claims, the singular forms "a," "and," and "the" include plural referents, unless the context clearly dictates otherwise. Thus, for example, reference to "a polymer" includes more than one polymer, reference to "a substituent" includes more than one substituent, reference to "a layer" includes multiple layers, and the like.

The term "inert" to refer to a substituent or compound means that the substituent or compound will not undergo modification either (1) in the presence of reagents that will likely contact the substituent or compound, or (2) under conditions that the substituent or compound will likely be subjected to (e.g., chemical processing carried out subsequent to attachment an "inert" moiety to a substrate surface).

The term "available" to refer to an optionally substituted carbon atom refers to a carbon atom that is covalently bound to one or more hydrogen atoms that can be replaced by a designated substituent without disrupting or destabilizing the remaining structure of the molecule. "Optional" or "optionally" means that the subsequently described circumstance may or may not occur, so that the description includes instances where the circumstance occurs and instances where it does not. For example, the phrase "optionally substituted" means that a non-hydrogen substituent may or may not be present, and, thus, the description includes structures wherein a non-hydrogen substituent is present and structures wherein a non-hydrogen substituent is not present.

There are many kinds of Magnesium Di-Hydroxide (Mg(OH)$_2$ or MDH) materials on the market. The current practices directed at enhancing the compatibility of MDH with plastics are to coat the particles with silane, [Toshimitsu, J., Suzuki, J.: Eur. Pat. Appl.: 1422262, 2004.] amine or polymeric materials using a precipitation process and disperse the modified MDH in a polymer. However since non-specific functionalized MDH was used in these examples well defined composite structures were not prepared.

One approach to a composite structure was described in JP 2005179576 which described an uncontrolled 'grafting to' reaction. The composite was prepared by treating the magnesium dihydroxide with 3-methacryloxypropyltrimethoxysilane (a coupling agent further comprising an unsatutated C—C double bond), and then in the presence of AIBN as a free radical initiator, styrene was "grafted through" the silane-treated Mg(OH)$_2$ to give Mg(OH)$_2$ particles having an attached polymer layer. The polymer layer thickness was 6.0 nm and the polymer had a Mn=20,000, and a Mw=95,000. The MWD is above 4.0. There is no means to control the thickness of the randomly attached polystyrene chains or the number of chains attached to the particle.

A need therefore exists for a procedure to controllably graft radically copolymerizable chains to MDH particles to improve the dispersibility of the composite structures in a range of commercial plastics. Definitions for "controllably polymerized" are provided in incorporated references.

Mg(OH)$_2$ particles contain hydroxyl groups on the surface and they can be functionalized to provide an ATRP initiator. One embodiment of such a functionalization reaction is an esterification reaction that can be conducted by reaction with bromopropionyl bromide as shown below.

Scheme 1.
Reaction pathway for synthesis of a MDH-based initiator

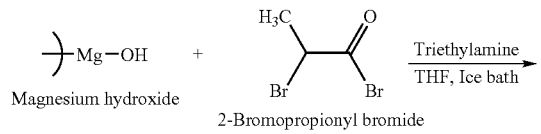

-continued

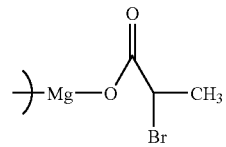

Not every hydroxyl group on the surface of a particle has to be functionalized in order to improve the dispersibility of the particle in final material since as few as one attached chain can assist in dispersion of a particle in a contacting matrix. However, it is possible to adjust the number of tethered chains by controlling the amount of first functionalization agent reacted with the MDH particle to attain the desired number of tethered chains. The fraction of —OH groups present in a MDH particles that were functionalized by reaction with a precursor of an ATRP initiator can vary between 0.01% and 5% depending on particle size and ratio of acid halide to particle used in the functionalization reaction. In the following examples, particles with between 0.1 and 1.0% of tethered initiating species were used. Commercially available MDH particles were used in the study.

In another embodiment of the invention, the ligand on the ATRP catalyst complex is selected to allow separation of the catalyst complex from the final MDH composite structure by adsorption onto an added resin, or extraction into an added solvent.

The catalyst can then be recycled, directly if reverse ATRP or AGET ATRP is employed or after reduction if a direct ATRP is used.

The attached halide functionality can be converted into an initiator for nitroxide mediated polymerization or RAFT using published procedures, if one desire to conduct another CRP process.

Any technique may be used to provide the surface-tethered brush polymers, so long as the polymers are covalently bound to the terminal or available functional groups on the surface of the particle. One preferred technique described in detail below involves derivatization of the exposed functional group with a living free radical polymerization initiator or a precursor of a living free radical polymerization initiator followed by living free radical polymerization of substituted or unsubstituted vinyl monomers.

The range of copolymerizable vinyl monomers are defined in incorporated references. Another preferred controlled polymerization techniques involve surface-initiated ring-opening polymerization ("ROP") of cyclic esters such as cyclic ethers, lactones, lactides, and the like, in the presence of a suitable promoter, optionally in the presence of an organometallic promoter such as an aluminum alkoxide. For example, the hydroxyl group can serve as a polymerization initiating moiety for the ring-opening polymerization.

The thickness of the polymer coating and polydispersity of the covalently attached polymer changes can be readily controlled, e.g., by controlling polymerization time and temperature, catalyst and the like.

Still other preferred polymerization techniques involve controlled procedures that are initiated from well-defined initiating groups that are bound to the substrate surface. These polymerization techniques include, but are not limited to, cationic procedures, metathesis ("ROMP") polymerizations, and the like. Alternatively, the functional group may be involved in condensation polymerizations, in which case the functional group attached to the surface undergoes reaction with monomers, oligomers and polymers in the polymerization step.

The invention therefore is directed at the preparation and use of MDH particles with attached (co)polymer chains where the molecular weight, composition and functionality of the tethered (co)polymer chains are selected to provide materials that are miscible with the target plastic material.

The formed MDH nanocomposite particles, either alone or in conjunction with other intumescent additives, provide flame retardancy properties to the final composite structure. The following examples provide examples of one of the many ways MDH particles with tethered polymer chains can be prepared. Therefore, while the examples exemplify the invention they do not limit the invention to a single polymerization process for conducting the grafting from reaction.

EXAMPLES

Certain embodiments of the invention are illustrated by the following non-limiting examples.

MDH (d=50~100 nm, a=20 m$^2$/g) was purchased from Sakai Chem and used after drying thoroughly in a convection oven. Other reactants were purchased from Aldrich and introduced to reactions without further purification except monomers. Polymerization inhibitors in the acrylate monomers were removed by passing through a column packed with basic alumina.

Example 1

Preparation of MDH Particles with Attached Initiator Moieties

Dry MDH (8.5 g, 100 mM), triethylamine (13.93 ml, 100 mM) and THF (150 ml) were placed in a 250 ml flask that was immersed in an ice bath. 2-Bromopropionyl bromide (15.71 ml, 150 mM) was slowly added drop wise using a dropping funnel, one should use caution since it can be a violent exothermic reaction. After stirring of the mixture for 2 hours, it was poured onto a filter paper then washed several times with distilled water, until the color turned to pale ocher. If the color of the mixture was dark, additional washing with acetone was effective to remove excess bromide moiety. The powders were dried under vacuum. For further use in ATRP, the initiator powders were crushed using a pestle and mortar. In this step, MDH should be dried in a vacuum oven to remove water, or unexpected clots of the powders would form and lower the reactivity.

The procedure is included as a comparator since an alternate procedure worked better in later laboratory scale examples. However, with good industrial control over the process, this procedure should work.

Example 2

Development of Procedure

Dried MDH (8.5 g, 100 mM), triethylamine (13.93 ml, 100 mM) and anhydrous THF (150 ml) were added to a 250 ml flask immersed in an ice bath. 2-Bromopropionyl bromide (15.71 ml, 150 mM) was carefully added drop wise using a dropping funnel, since it is a violent exothermic reaction. After stirring for 2 hours in the ice bath, the reaction continued at room temperature. After 24 hours, the mixture was diluted with additional THF and was centrifuged. After centrifugation, the clear solvent was decanted from the solid and substituted with fresh THF. These steps were repeated until the liquid became clear and colorless.

Example 3

Attachment of 2-bromo-2-methylpropionyl Initiator to MDH

In this procedure, MDH (8.5 g, 100 mM), triethylamine (13.93 ml, 100 mM) were slurried in THF in a cooled flask and 2-bromo-2-methylpropionyl bromide (18.54 ml, 150 mM) was slowly introduced forming the attached initiator as shown below in Scheme 2.

Scheme 2.

MDH particles with attached initiator functionality.

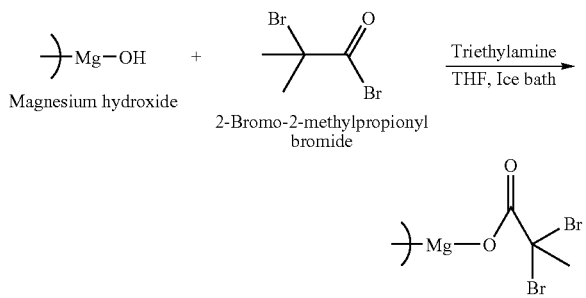

In the following examples, purified monomers and an oxygen free environment were used since it was desirable to follow the reaction kinetics and determine the rate and extent of chain growth. In an industrial environment, such pre-reaction care is not required, as reaction kinetics will have been well defined and low levels of air can be tolerated.

Example 4

Preparation of MDH Particles with Attached Polystyrene Chains

This comparator is included to demonstrate the importance of the procedures used to form the first functionalized MDH particles. The MDH-based initiator prepared in E1/C1 was used for the first ATRP "grafting from" a MDH particle reaction.

The Mg(OH)$_2$-initiator (0.073 g; 0.2226 mM), PMDETA (0.077 g; 0.4451 mM), styrene (2.315 g; 22.256 mM) and two drops of toluene were placed in a 50 ml Schlenk flask. After purging with nitrogen and three consecutive freeze-pump-thaw cycles, CuBr (0.064 g; 0.4451 mM) was added to the flask and a bulk polymerization was performed at 110° C. for 2 hours. The polymer prepared in this reaction had a molecular weight measured by GPC as 2.6×10$^5$ and PDI was as 1.73. The ratio between initiator and monomer was 1:100 but the molecular weight was 2.5 times higher. This considerable difference between the actual and theoretical molecular weight might arise from uneven functionalizing of MDH particles and the reasons of this maldistribution of initiators could be low reactivity of hydroxyl groups, or more likely resulted from the oversized particles that formed during the drying of particles after functionalizing. According to a recent paper directed at functionalization of silica particles [Kohji Ohno et al., Macromolecules, 2005 38, 2137] keeping particles wet during all reactions was essential for even distribution of initiators and polymer chains grown from the particles. In the paper, the authors performed solvent exchange many times with a centrifuge. Therefore, this approach to keeping the particles wet at all times was used in subsequent examples. Also, the smaller size MDH particles will be introduced to assist in overcoming the problem of agglomeration.

Example 5

Preparation of MDH Particles with Attached Poly(Butyl Acrylate) Chains

This example is included as a comparison example to show what occurs when the ligand used to form the ATRP catalyst complex is selected only to provide a catalyst complex with appropriate activity.

Bulk polymerization of butyl acrylate was performed via ATRP from the functionalized MDH particles. Ethyl 2-bromoisobutyrate was introduced a sacrificial initiator to check the progress of polymerization. The $Mg(OH)_2$-initiator (0.164 g.), ethyl 2-bromoisobutyrate (0.098 g.), PMDETA (0.173 g), butyl acrylate (3.2 g) and two drops of toluene were placed in a 50 ml Schlenk flask. After purging with nitrogen and three consecutive freeze-pump-thaw cycles, CuBr (0.144 g) was added to the flask and a bulk polymerization was performed at 50° C. In this experiment, the rate was almost too fast to control and it seemed to be a result of the PMDETA catalyst complex. Although the reaction was maintained at 50° C. for 10 hours, the color of the reactants turned to dark green just 2 hours after initiation. Using the sacrificial initiator, the growth of free polymers were checked and it showed that a molecular weight of 3,570 and PDI of 1.08 was achieved after 1 hour while a molecular weight of 9,040 and PDI of 1.14 was realized at 10 hours. The conversion of the monomer at 1 hour was 31% and increased to almost 99% at 10 hours. After the polymerization was completed, the solid composite particles were isolated using repetitive centrifuging steps in THF. However, separation of white (MDH) particles from $CuBr_2$ was almost impossible, in spite of the aid of a reducing agent tin octanoate to convert the Cu(II) complex to a more soluble Cu(I) complex. This problem arose from the use of PMDETA as ligand which formed an insoluble complex with Cu.

The following examples use dNbipy as ligand since it forms a soluble complex.

Example 6

MDH Particles with Tethered Butyl Acrylate Chains

The initiator-attached MDH particles (0.312 g, 0.95 mM), methyl 2-bromopropionate (0.0056 ml, 0.05 mM), dNdpy (0.409 g, 1 mM) and butyl acrylate (36.6 ml, 250 mM) were placed in a 50 ml Schlenk flask. After nitrogen purging, impurities in the reactants were removed via repeated freeze-pump-thaw cycles for 3 times. CuBr (0.072 g, 0.5 mM) was added into the flask and then the reactor was placed into an oil bath preheated to 70° C. In this experiment, methyl 2-bromopropionate was introduced as a sacrificial initiator to estimate molecular weight of the polymer grown from the surface of MDH particles. The sacrificial initiator has a secondary structure similar to the initiator which was attached to the MDH particles. Although the ratio between initiator which was attached on the surface of MDH and sacrificial one was presumed as 0.95:0.05, accurate measurement was essential. Conversion ratios and molecular weights were measured periodically using samples taken during the reaction via degassed syringes. Those results are shown in FIG. 1. The following are the values of Mn with time: after 1 hr, Mn=26,680; 2 hr, Mn=24,790; 4 hr, Mn=21,480 and 22 hr, Mn=51,230. From the molecular weight diagram it can be seen that initiation was slow and irregular but that the situation became stable afterward. This phenomenon might be due to fast initial reaction rate caused by use of pure CuBr, if so addition of $CuBr_2$ would improve the initiation efficiency. After 22 hours the final molecular weight and PDI were 51,230 and 1.17, respectively indicative of a well controlled grafting from reaction. (Measurement of molecular weight for the 'grown' polymer was conducted later by cleaving the tethered chains from the particle.) After termination of polymerization, the mixture in the flask was poured into a vial and vigorously mixed with THF. The complex of dNdpy and $CuBr_2$ dissolved in THF which was decanted from the functionalized particles which were dispersed in THF again. This mixing/centrifuging process was repeated five times. The particles were dried in a vacuum chamber.

Figure 2:
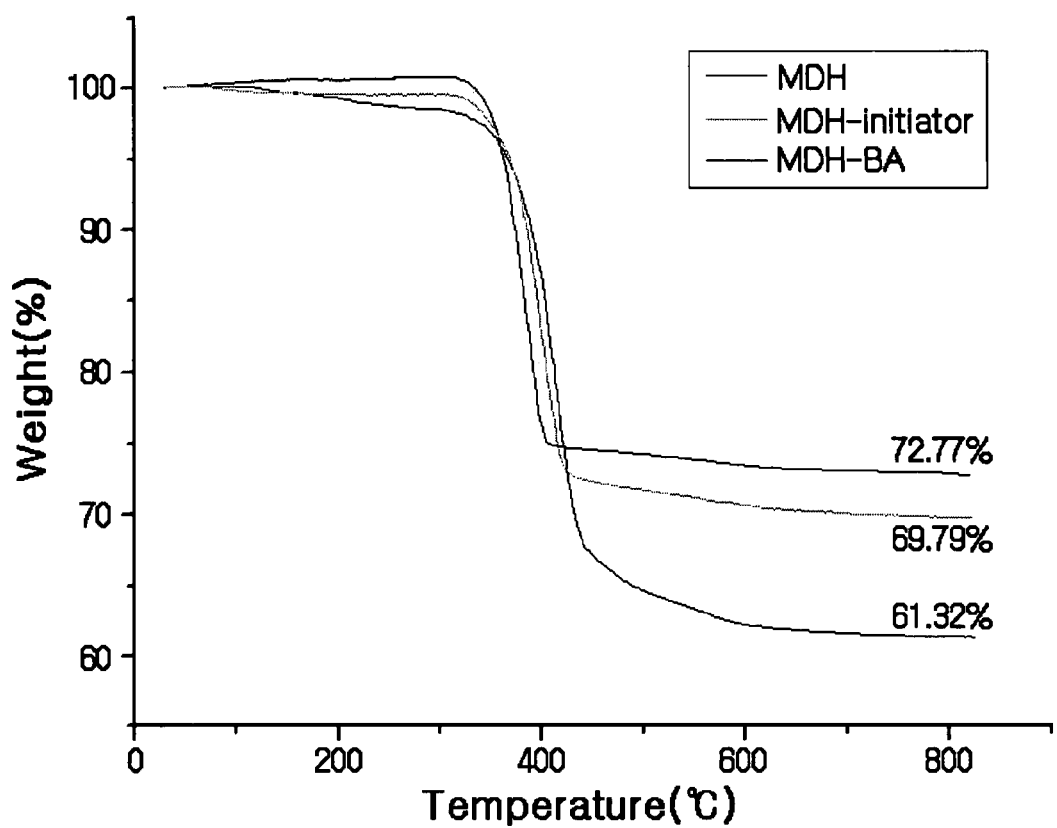
FIG. 2 shows TGA diagrams for pure MDH, MDH with attached initiator, and MDH with attached polymer (poly (nbutyl acrylate)).

In order to show the progress of this procedure TGA diagrams for pure MDH, MDH with attached initiator functionality and the final MDH with tethered poly(n-butyl acrylate) chains are shown in FIG. 2, which clearly shows differences between the three samples. It is known that ordinary $Mg(OH)_2$ powders can release 27~30% of water when heated. There is about a 3% gap between MDH and initiator-attached particles in the curves indicating the presence of attached initiating functionality. In case of polymer-attached MDH particles, roughly 39% of water and organic parts were present. The remaining moiety was from MgO formed by dehydration of $Mg(OH)_2$.

Example 7

MDH Particles with Tethered Butyl Acrylate Chains

When functionalizing a new batch of MDH particles, it was found that the larger particles had agglomerated during drying and that dry particles were difficult to crush into uniform particles. When a butyl acrylate polymerization was conducted from these non-uniform particles MW increased with time, but the final polymer had a broader PDI of 1.49. Therefore, in order to avoid such agglomeration the larger particles were kept "wet" throughout the isolation process. After the particles were reacted with triethylamine and 2-bromopropionyl bromide in THF, they were mixed with additional water and centrifuged for 1 hour centrifuge the solvent was removed and fresh water was added and these steps were repeated five times to remove HBr. Then the solvent was changed to THF using the same slurry/centrifuge procedure. The particles were stored as a THF slurry. Prior to polymerization, the particles were centrifuged again to exchange THF with butyl acrylate. The mixture of particles and monomer was placed in a 50 ml Schlenk flask, and other reagents in the reaction, shown in Table 1, were added to the flask.

TABLE 1

Reagents and amounts for polymerization of butyl acrylate

| No. | Reagent | MW | Amount | | mM |
|---|---|---|---|---|---|
| 1 | $Mg(OH)_2$-initiator | 328 | 3.05 g | Ini.: 0.136 g | Ini.: 0.5 |
| 2 | Methyl 2-bromopropionate | 167 | 0.084 g | 0.056 ml | 0.5 |
| 3 | CuBr | 143.5 | 0.036 g | | 0.25 |
| 4 | $CuBr_2$ | 223.4 | 0.0028 g | | 0.0125 |

TABLE 1-continued

Reagents and amounts for polymerization of butyl acrylate

| No. | Reagent | MW | Amount | | mM |
|---|---|---|---|---|---|
| 5 | dNdpy | 408.7 | 0.205 g | | 0.5 |
| 6 | Butyl acrylate | 128 | 32 g | 36.57 ml | 250 |
| 7 | Toluene | | 2 drops | | |

Figure 3:
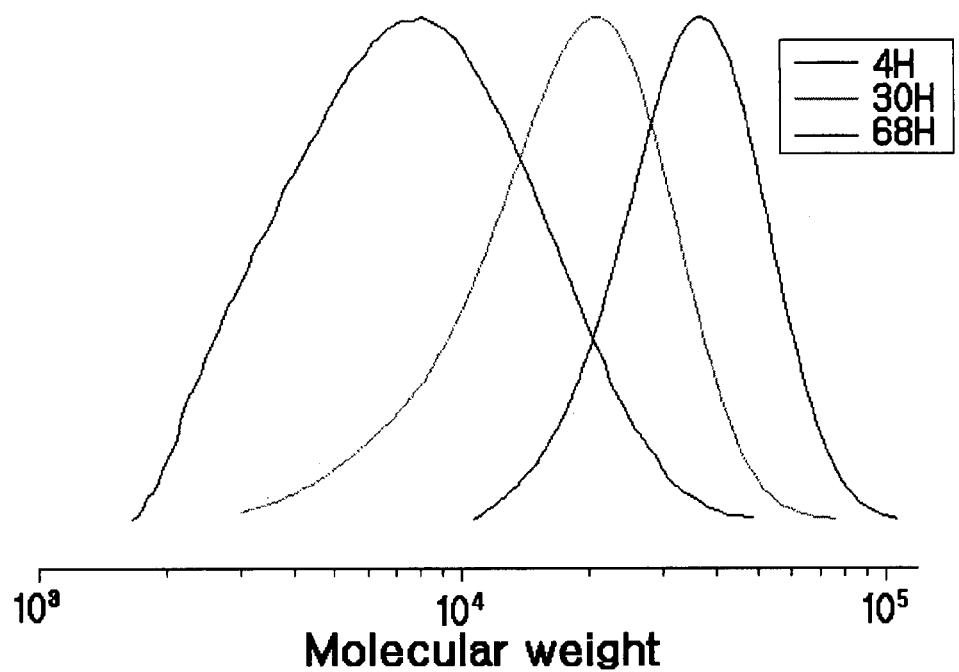
FIG. 3 shows the molecular weights, polydispersities and conversion ratios during the polymerization.
Figure 3:
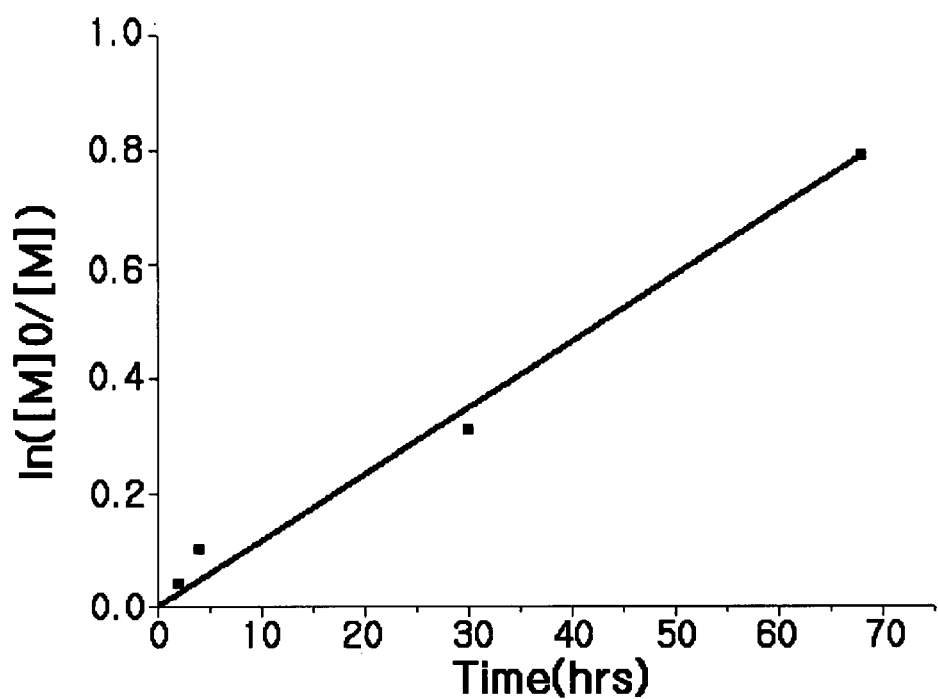

The reaction was performed at 70° C. for 50 hours. Molecular weights, polydispersities and conversion ratios during the polymerization are shown in FIG. 3, and also listed in Table 2.

TABLE 2

Molecular weights, polydispersities and conversion ratios.

| | 2 H | 4 H | 30 H | 68 H |
|---|---|---|---|---|
| $M_n$ | 2,100 | 6,300 | 18,700 | 32,300 |
| PDI | 1.49 | 1.47 | 1.39 | 1.15 |
| Conversion (%) | 4 | 10 | 27 | 55 |

In this example, controllability was much better than previous experiments and it was concluded that this may be a result of the use of $CuBr_2$ and 'wet' particles.

Cleavage of polymer chains attached to MDH was done using known methods. [H. G. Börner, K. Beers, K. Matyjaszewski, S. S. Sheiko and M. Möller, *Macromolecules* 2001, 34, 4375]

A 50 ml round-bottomed flask was charged with MDH-polyBA (50 mg), THF (30 ml), 1-butyl alcohol (15 ml) and concentrated sulfuric acid (1 ml). The flask was fitted with a water condenser, and the mixture was stirred at 95~100° C. for a week. The solvent was removed under vacuum, and residual solid was dispersed in chloroform. After extraction of the sulfuric acid moiety with a small amount of water, the organic phase was isolated and the solvent was distilled off. The remaining solid was dispersed in anhydrous THF.

Figure 4:
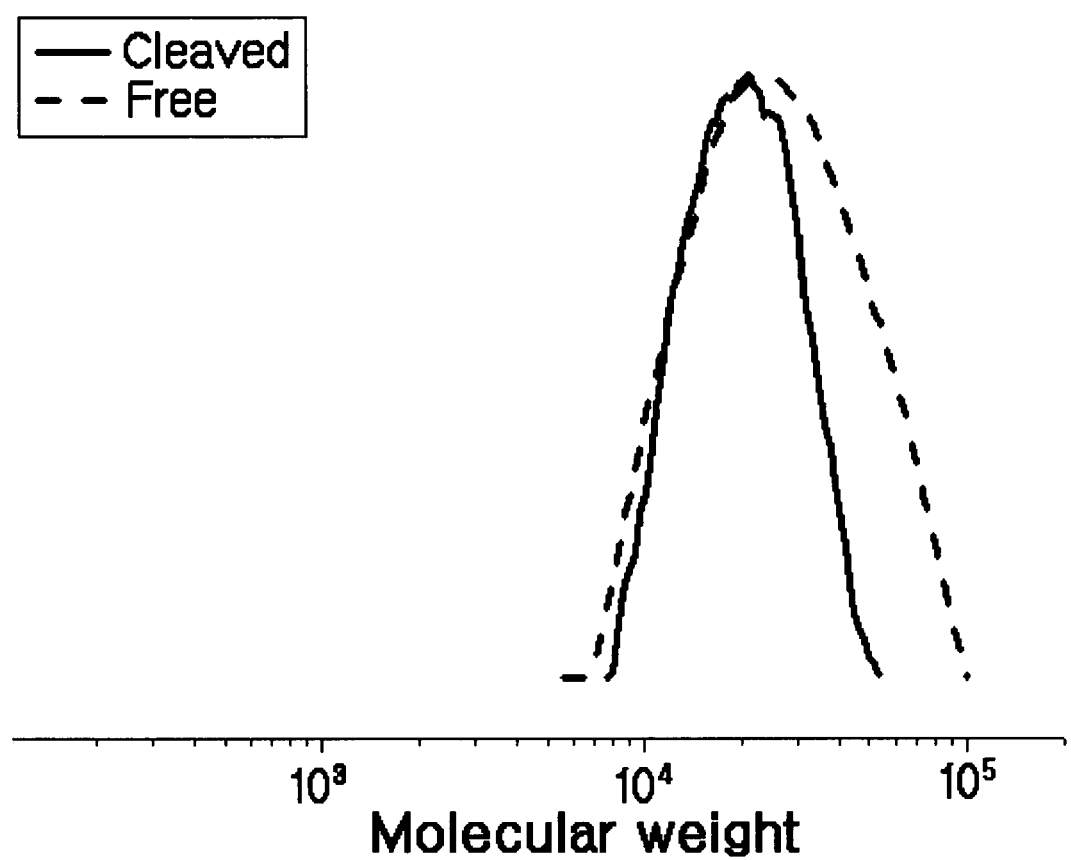
FIG. 4 shows comparison of the molecular weight of the free polymer with the cleaved one.

MDH in the liquid were removed by filtration through a PTFE membrane, and the molecular weight of cleaved polyBA in the filtrate was analyzed by GPC. The result was shown in FIG. 4 where it is compared with the molecular weight of free polymer. Molecular weights and polydispersities of free polymer were 20,300 and 1.49 while those values of cleaved one were 19,100 and 1.16, respectively indicating a controlled grafting from polymerization had occurred.

Analysis of MDH-PolyBA Hybrid Particles

Two vials, one filled with bare MDH and the other with MDH-polyBA particles were dispersed in THF were placed aside for comparison of the stability of the suspension. As time goes by, the unmodified particles began to sediment after 30 minutes and were fully precipitated after 5 hours. The other hand, MDH-polyBA particles in formed a stable dispersion even after 2 weeks.

Example 8

Synthesis of MDH-PolyMMA Hybrid Particles

In a similar manner to the above examples, polymerization of MMA monomer was performed to attach polyMMA chains to MDH particles having an average particle diameter of 80 nm. For this reaction, the MDH particles were functionalized by reaction with 2-bromo-2-methylpropionyl bromide using triethylamine and THF in an ice bath as described above forming tethered initiators suitable for ATRP of MMA. In this experiment, ethyl 2-bromoisobutyrate was adopted as a tertiary sacrificial initiator to check progress of polymerization and molecular weight of polyMMA. Since it was difficult to estimate the amount of initiator moiety attached to the MDH particles, an assumption that 1% initiator moiety was attached to the MDH particles was used for stoichiometry calculations. An accurate estimation, the initiator-attached particles using elemental analysis was conducted later and is provided below. It was shown that approximately 1 in 60 of the hydroxyl groups in the MDH particles were actually functionalized.

The initiator-attached MDH particles (1 g; presumed initiator moiety: 0.17 mM), ethyl 2-bromoisobutyrate (0.025 ml, 0.17 mM), dNdpy (0.07 g, 0.17 mM), methyl methacrylate (36.4 ml, 340 mM) and MEK (30 ml) were placed in a 50 ml Schlenk flask. After purging with nitrogen gas, impurities in the reactants were removed via repeated freeze-pump-thaw cycles for 3 times. CuBr (0.012 g, 0.083 mM) and $CuBr_2$ (0.00094 g, 0.0042 mM) were added into the flask and then the reactor was placed into an oil bath preheated to 70° C. During the reaction molecular weights of free polymer and progress of polymerization were measured with small amounts of samples. After 24 hours, the reaction was terminated by exposure to air. The white sticky mixture in the flask was poured into a centrifuge tube and mixed with fresh THF. After vigorous shaking, the mixture was centrifuged and then the clear solution was decanted from the sedimented particles, thereby removing both the free polymer as well as formed complex of dNdpy and $CuBr_2$ dissolved in THF. This step was repeated five times to eliminate impurities. To make sure the removal of other materials, a sample taken from upper solution in the centrifuge tube was analyzed using NMR; only peaks of THF were observed.

The progress of the reaction, conversion, molecular weights and PDI, were measured during polymerization using the free polymer to monitor the reaction. Though MEK had been added as an extra solvent, a sudden gelation was observed 12 hours after the start of reaction and the mixture in the flask became viscous. The PDI began to broaden at the time of gelation. As a result, after 24 hours, a particle with an attached polyMMA having $M_n$ of 127,000 and PDI of 1.40 was synthesized after 76% conversion.

Figure 5:
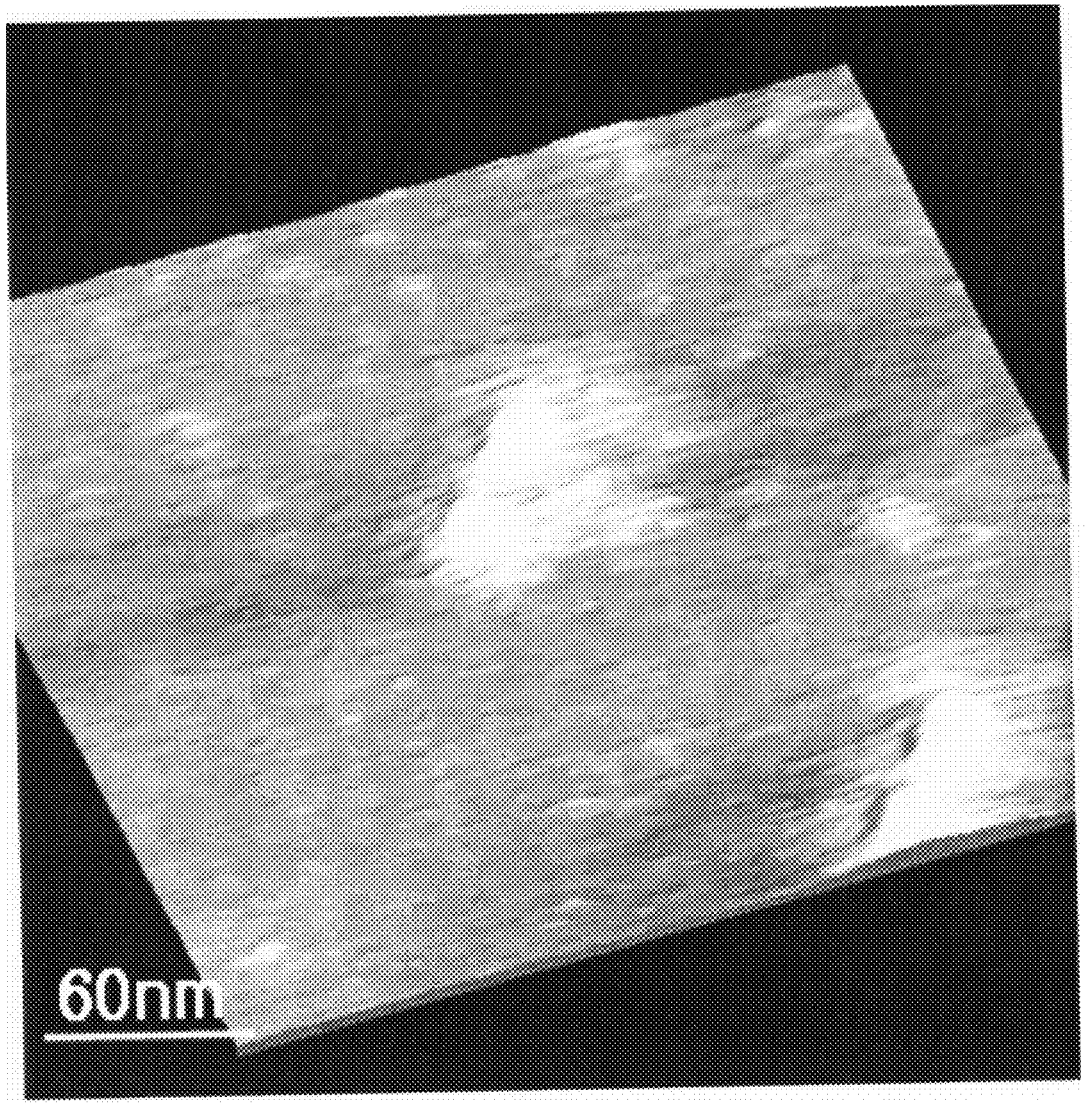
FIG. 5 shows a 2D Height AFM micrograph of MDH-polyMMA.

AFM was used to check that polymer chains were indeed attached onto MDH particles. A magnified image is shown in FIG. 5, and some chains around the particles can be detected spreading out on the surface.

Example 9

Larger Scale Synthesis of MDH-poly(Methyl Methacrylate) Hybrid Particles

MDH-poly(methyl methacrylate) particles have also been being prepared in a larger scale in order to provide sufficient material for further practical tests.

Figure 6:
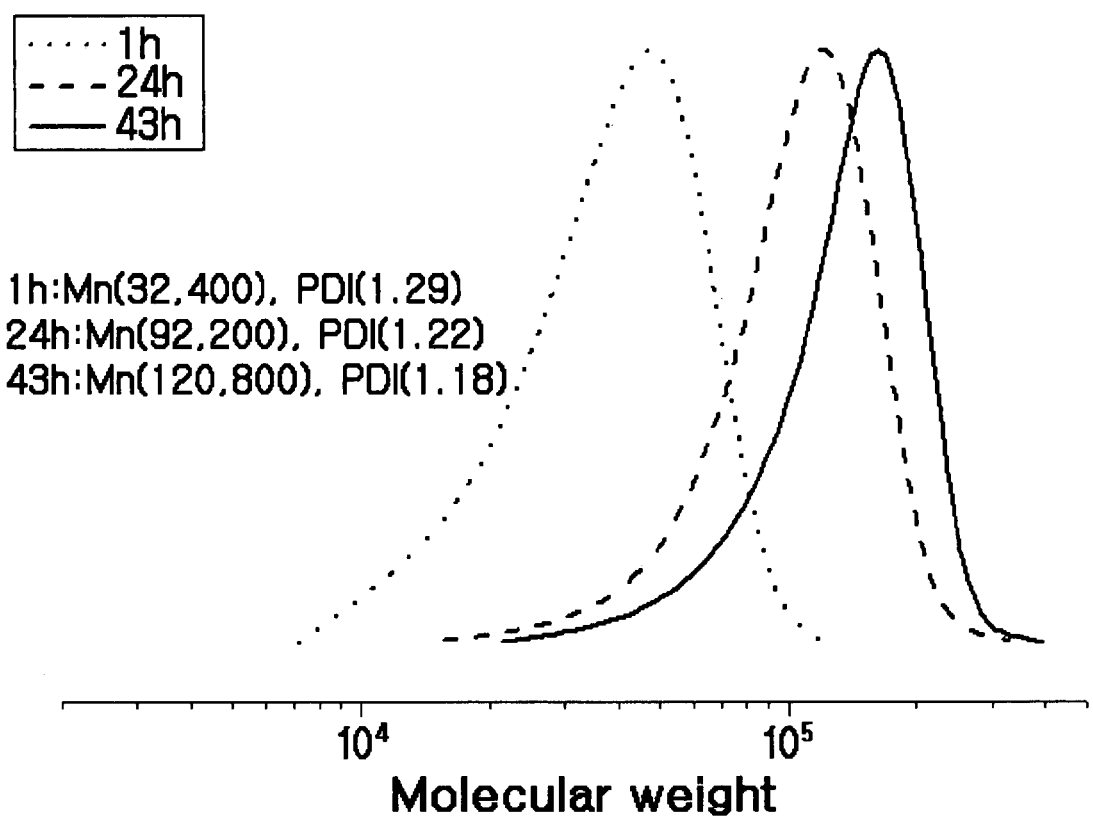
FIG. 6 shows molecular weight evolution during large scale polymerization of MMA from MDH tethered initiators.

The method used in this experiment was almost identical with previous one. The MDH particles with attached initiator-functionality (17 g; presumed initiator moiety: 3 mM), ethyl 2-bromoisobutyrate (0.44 ml, 3 mM), dNbpy (1.23 g, 3 mM), methyl methacrylate (642 ml, 6 M) and toluene (100 ml) were placed in a 1 l Schlenk flask. After purging with nitrogen gas, impurities in the reactants were removed via repeated freeze-pump-thaw cycles for 3 times. CuBr (0.215 g, 1.5 mM) and $CuBr_2$ (0.0168 g, 0.075 mM) were added into the flask and then the reactor was placed in an oil bath preheated to 70° C. The progress of the reaction was followed by periodic removal of small samples of the reaction mixture for GPC analysis of the molecular weight of the free polymer chains. After 43 hours, the reaction was terminated by exposure to air. (Converting all catalyst to Cu(II) for easy removal.) The viscous mixture in the flask was poured into a centrifuge tube and mixed with fresh THF. After vigorous shaking to ensure thorough dispersion, the mixture was centrifuged and then clear solution was decanted from the sediment particles in addition to removing the free polymer chains. The formed complex of dNbpy and $CuBr_2$ which had dissolved in THF was also removed during the centrifuge step. This slurry/centrifuge procedure was performed five times to separate pure hybrid particles. Measured molecular weight using GPC from free polymer chains was 120,800 and PDI was 1.18. Results are shown (FIG. 6).

Example 10

Synthesis of MDH-poly(Dodecyl Methacrylate) Hybrid Particles

Polymerization of dodecyl methacrylate monomer was performed to attach tethered polymer chains with longer alkyl functionality to MDH particles for better mixing properties with olefinic matrix polymers.

The initiator-attached MDH particles (1 g; presumed initiator moiety: 0.17 mM), ethyl 2-bromoisobutyrate (0.025 ml, 0.17 mM), dNdpy (0.07 g, 0.17mM), dodecyl methacrylate (19.93 ml, 68 mM) and toluene (30 ml) were placed in a 100 ml Schlenk flask. After purging with nitrogen gas, impurities in the reactants were removed via repeated freeze-pump-thaw cycles for 3 times. CuBr (0.012 g, 0.083 mM) and $CuBr_2$ (0.00094 g, 0.0042 mM) were added to the flask and then the reactor was placed in an oil bath preheated to 70° C. During the reaction molecular weights of free polymer and progress of polymerization were measured with periodic removal of small amount of a sample. After 50 hours, the reaction was terminated by exposure to air. The viscous mixture in the flask was poured into a centrifuge tube and mixed with fresh THF. After vigorous shaking, the mixture was centrifuged and then the clear supernaught solution was decanted from the sediment particles to remove free polymer chains and the formed complex of dNdpy and $CuBr_2$ dissolved in THF. This step was performed repeatedly for five times to separate pure hybrid particles. Progress of conversion and molecular weights were measured during polymerization using free polymer and results show that the reaction was comparatively well controlled. Initially a fast reaction rate was observed and then the slope of increasing molecular weights versus time slowed down. The final polymer had a molecular weight of 52,300 and PDI 1.21 at 89% conversion.

Example 11

Synthesis of MDH-poly(Octadecyl Methacrylate) Hybrid Particles

Octadecyl methacrylate monomer was chosen owing to its inherent long alkyl chain. Since the chemical nature/composition of the tethered polymer chains of the nanocomposites is the fundamental factor that determines compatibility and unique characteristics in polymer blends, ODMA is a promising candidate for preparation of composite structures that would be soluble in oleophylic matrices.

The monomer was purified using a known method prior to polymerization. Octadecyl methacrylate was dissolved in hexane and extracted four times with 5% aqueous NaOH. After drying the organic phase over anhydrous magnesium sulfate, the solution was passed through neutral alumina and the solvent was removed under reduced pressure.

Previously prepared initiator-attached MDH particles (1 g; presumed initiator moiety: 0.17 mM), ethyl 2-bromoisobutyrate (0.025 ml, 0.17 mM), dNdpy (0.07 g, 0.17 mM), octadecyl methacrylate (22.21 ml, 56.7 mM) and toluene (30 ml) were placed in an 100 ml Schlenk flask. Repeated freeze-pump-thaw cycles were followed by purging with nitrogen gas to remove impurities in the reactants. CuBr (0.012 g, 0.083 mM) and $CuBr_2$ (0.00094 g, 0.0042 mM) were added to the flask and then the reactor was placed into an oil bath preheated to 70° C. During the reaction the progress of polymerization was followed by monomer conversion and measured molecular weight of the free polymer. After 57 hours, the reaction was terminated by exposure to air. All other procedures were almost identical with the polymerization of DDMA.

It has been demonstrated that MDH particles can be functionalized with different initiators suitable for an ATRP polymerization and that nanocomposite structures can be prepared by "grafting from" polymerization using a range of monomers. The catalyst complex should be selected to provide an appropriate reaction rate and ease of separation from the final composite particles.

These examples demonstrate the concept and any (co)polymerizable monomer described in the incorporated references can be used to tailor the composite structure for dispersion in any matrix.

While the examples provided are homopolymers, copolymers can also be prepared as described in cited references. Nanocomposites with tethered gradient copolymers are particularly useful for reinforcement of blends in addition to providing flame retardancy.

Further since it is known how to convert the attached halide functionality into functionality for nitroxide mediated polymerization and RAFT/MADIX polymerization, this disclosed procedure for functionalization of MDH particles can be used to provide particles suitable for initiation of any controlled radical polymerization from a MDH particle.

Further, the inherent functionality or added functionality can be employed to initiate other controlled polymerization processes.

The examples therefore show that it is possible to prepare MDH particles with tethered polymer chains where the composition of the chains can be controlled by selection of contacting monomer units. Chain length can be predetermined by consideration of the number of attached initiating groups, monomer concentration and selection of appropriate reaction conditions; including temperature, time, optional solvents and catalyst composition where appropriate.

The embodiments of the invention described above are intended to be merely exemplary, and those skilled in the art will recognize, or will be able to ascertain using no more than routine experimentation, numerous equivalents of specific compounds, materials, and procedures. All such equivalents are considered to be within the scope of the invention and are encompassed by the appended claims.

What is claimed is:

1. A magnesium hydroxide (MDH) composite comprising MDH particle with attached (co)polymer chains, wherein the $M_n/M_w$ of the tethered chains is less than 2.0.

2. A process for the preparation of the MDH composite of claim 1, wherein a controlled radical (co)polymerization is conducted from attached initiator functionality.

3. The process of claim 2, wherein the controlled radical (co)polymerization is a NMP, RAFT/MADIX or ATRP reaction.

4. The process of claim 2, wherein the controlled radical (co)polymerization is an ATRP.

5. The process of claim 4, wherein a ligand is selected to allow separation of a catalyst complex from the MDH composite, after the reaction is complete by dissolution in a solvent, a reactant or an added solvent.

6. A polymer blend or alloy comprising the MDH composite of claim 1, wherein the composite is dispersed in an added plastic material.

7. A process for the preparation of the MDH composite of claim 1, wherein the polymerization is conducted in a slurry or dispersion.

8. The process of claim 7, wherein the first MDH particles are functionalized by conducting an esterification reaction with a molecule additionally comprising a functional group to initiate a polymerization reaction.

* * * * *